(12) United States Patent
Hirata

(10) Patent No.: US 7,699,477 B2
(45) Date of Patent: Apr. 20, 2010

(54) ALIGNMENT METHOD, ALIGNMENT APPARATUS, AND ALIGNMENT SCREEN FOR OBJECTIVE-LENS GUIDING DEVICE

(75) Inventor: Tadashi Hirata, Hachioji (JP)

(73) Assignee: Olympus Corporation, Tokyo (JP)

( * ) Notice: Subject to any disclaimer, the term of this patent is extended or adjusted under 35 U.S.C. 154(b) by 436 days.

(21) Appl. No.: 11/830,692

(22) Filed: Jul. 30, 2007

(65) Prior Publication Data

US 2008/0049311 A1    Feb. 28, 2008

(30) Foreign Application Priority Data

Aug. 25, 2006    (JP) ............... 2006-229718

(51) Int. Cl.
    *G02B 21/36*    (2006.01)
(52) U.S. Cl. .................................... 359/505
(58) Field of Classification Search ................. 359/117, 359/118, 505, 506, 819, 820
    See application file for complete search history.

(56) References Cited

U.S. PATENT DOCUMENTS 5,820,547 A    10/1998  Strobl et al.
6,511,418 B2 *  1/2003  Shahidi et al. .............. 600/117

FOREIGN PATENT DOCUMENTS

EP    1524542 A1    4/2005
JP    2005-121947   5/2005
JP    2005338631    12/2005
WO    9900689 A2    1/1999

OTHER PUBLICATIONS

European Office Action dated Dec. 27, 2007 in corresponding foreign application.

* cited by examiner

*Primary Examiner*—Euncha P Cherry
(74) *Attorney, Agent, or Firm*—Pillsbury Winthrop Shaw Pittman, LLP

(57) ABSTRACT

An end face of a narrow-diameter end portion is easily disposed at a correct position on an examination object without setting an examination site, thus enabling rapid and straightforward acquisition of an image of the examination site. The invention provides an alignment method for a guiding device which is attached to an end of an objective lens in such a manner as to be capable of positional adjustment in an optical axis direction and which is brought into contact with an examination target to make a focal position of the objective lens coincident with an examination site. The alignment method comprises securing, to an end face of the guiding device, an alignment screen, having a predetermined pattern; relatively moving the objective lens and the guiding device, to which the alignment screen is secured, in the optical axis direction; fixing relative positions of the objective lens and the guiding device at a position where an in-focus image of the pattern of the alignment screen is obtained, or at a position further relatively shifted by a predetermined distance from that position; and removing the alignment screen from the guiding device.

12 Claims, 14 Drawing Sheets

ALIGNMENT METHOD, ALIGNMENT APPARATUS, AND ALIGNMENT SCREEN FOR OBJECTIVE-LENS GUIDING DEVICE

BACKGROUND OF THE INVENTION

1. Field of the Invention

The present invention relates to an alignment method, an alignment apparatus, and an alignment screen for an objective-lens guiding device.

This application is based on Japanese Patent Application No. 2006-229718, the content of which is incorporated herein by reference.

2. Description of Related Art

To obviate the need for positioning which must be carried out each time the interior of a small laboratory animal or the like is observed, there is a known technique in the related art involving securing an objective-lens insertion tool, into which an objective lens can be inserted and adjusted in position, to the skin of the small laboratory animal under examination (for example, see Japanese Unexamined Patent Application, Publication No. 2005-121947).

However, with the objective-lens insertion tool described in Japanese Unexamined Patent Application, Publication No. 2005-121947, by securing the objective-lens insertion tool to the examination object once an examination site inside the small laboratory animal under examination is set, it is possible to carry out observation while positioned at the same location, even when repeatedly attaching and detaching the objective lens is. However, during the process of searching for the examination site, it is necessary to perform focusing each time. In addition, when observing the surface of an internal organ or the like with a narrow-diameter end portion provided at the end of the objective lens inserted inside the living organism, the end face of the narrow-diameter end portion is inserted inside the living organism and thus cannot be seen from outside. Therefore, it is not possible to accurately determine the positional relationship with the surface of the internal organ or the like, resulting in the drawback that focusing at the surface of the internal organ or the like must be performed by trial and error.

BRIEF SUMMARY OF THE INVENTION

The present invention has been conceived in light of the circumstances described above, and an object thereof is to provide an alignment method, an alignment apparatus, and an alignment screen for an objective-lens guiding device in which it is possible to easily locate an end face of a narrow-diameter end portion at a suitable position relative to an examination target, without setting an examination site, allowing rapid and straightforward acquisition of an image of the examination site.

In order to realize the object described above, the present invention provides the following solutions.

A first aspect of the present invention is an alignment method for a guiding device which is attached to an end of an objective lens in such a manner as to be capable of positional adjustment in an optical axis direction and which is brought into contact with an examination target to make a focal position of the objective lens coincident with an examination site, the alignment method including securing, to an end face of the guiding device, an alignment screen, having a predetermined pattern, at a position which intercepts the optical axis of the objective lens when the guiding device is attached thereto; relatively moving the objective lens and the guiding device, to which the alignment screen is secured, in the optical axis direction; fixing relative positions of the objective lens and the guiding device at a position where an in-focus image of the pattern of the alignment screen is obtained, or at a position further relatively shifted by a predetermined distance from that position; and removing the alignment screen from the guiding device.

According to the first aspect described above, when the guiding device, having the alignment screen attached to the end face thereof, is attached to the objective lens, the optical axis of the objective lens is intercepted by the alignment screen. Because the prescribed pattern is provided on the alignment screen, by observing with the objective lens attached to the microscope and relatively moving the objective lens and the guiding device in the optical axis direction, at any position, an in-focus image of the pattern on the alignment screen is obtained. At this position, since the end face of the guiding device is coincident with the focal position of the objective lens, the objective lens and the guiding device are fixed at this position or at a position relatively shifted therefrom by a predetermined distance, and the alignment screen is removed, whereupon, when the end face of the guiding device is placed in contact with the examination object, it is possible to align the focus at a desired examination target with superior precision.

In the first aspect described above, the alignment screen may be supported on the guiding device, and the guiding device and the objective lens may be relatively moved.

By doing so, merely by relatively moving the guiding device and the objective lens, it is possible to move the alignment screen relative to the objective lens without using another support member, which enables easy adjustment of the position of the guiding device.

In the first aspect described above, the guiding device and the objective lens may be moved relatively while measuring a load applied to one of the guiding device and the objective lens.

With this configuration, when the guiding device and the objective lens are pressed against each other, it is possible to measure the load thereof, which prevents the problem of excessive pressing, thus making it possible to prevent damage to the guiding device and the objective lens.

A second aspect of the present invention is an alignment screen used in the above-described alignment method for a guiding device, including a screen main body having a flat surface which placed in close contact with the end of the guiding device; and an attaching-and-detaching portion configured to attach the screen main body to the guiding device in such a manner as to allow attachment thereto and detachment therefrom, wherein the alignment screen has a predetermined pattern on the flat surface.

With this configuration, by operating the attaching-and-detaching portion, it is possible to attach the alignment screen with the flat surface of the screen main body in close contact with the tip of the guiding device. By fixing the guiding device and the objective lens at a position where a clear image of the prescribed pattern provided in the flat surface is acquired, it is possible to easily align the focus of the objective lens with a desired examination site with superior precision.

In the second aspect described above, the screen main body may be formed of a fluorescent material; and the pattern may be formed of indentations provided in the flat surface.

With this configuration, the fluorescence generated in the fluorescent material is collected by the objective lens, and the pattern formed by the indentations in the flat surface is acquired as a shadow image due to diffraction or diffuse reflection of the fluorescence. By forming the pattern of indentations, it is possible to form the fine pattern more easily. The indentations may be scored grooves formed in the flat surface.

In the second aspect described above, the screen main body may be formed of a fluorescent material; and the pattern may be printed on the flat surface.

It is possible to easily form the pattern by an intricate printing technique such as screen printing.

In the second aspect described above, the screen main body may be formed of a fluorescent material; and the pattern may be printed on a transparent sheet covering the flat surface.

With this configuration, by replacing the sheet, it is possible to perform sterilization, disinfection, and so forth of the screen main body, and then re-use it.

In the second aspect described above, the screen main body may be formed of a non-fluorescent material; and a pattern of fluorescent material may be printed on the flat surface.

With this configuration, by fixing the guiding device and the objective lens at a position where a clear image of the fluorescence emitted from the pattern formed of the fluorescent material is acquired, it is possible to make the focal position of the objective lens coincident with a desired examination site with superior precision. Furthermore, because the fluorescence is emitted from the pattern, it is possible to acquire a clear image of the fluorescence at a position where the fluorescence intensity peaks. Therefore, by measuring the fluorescence intensity, it is possible to perform automatic adjustment of the relative positions of the guiding device and the objective lens.

In the second aspect described above, the pattern may be formed more finely at a center portion than at edge portions.

With this configuration, by observing the large pattern at the edge portions with a low-magnification objective lens, and by observing the fine pattern at the center with a high-magnification objective lens, it is possible to make the focal position of the objective lens coincident with the respective desired examination sites with superior precision.

A third aspect of the present invention is an alignment apparatus for a guiding device which is attached to an end of an objective lens in such a manner as to be capable of positional adjustment in an optical axis direction and which is brought into contact with an examination target to make a focal position of the objective lens coincident with an examination site, the alignment apparatus including an objective-lens securing portion configured to secure the objective lens, to which the guiding device is attached, so as to enable positional adjustment, an alignment screen provided with a prescribed pattern being attached to the guiding device at an end portion thereof; a visible light source configured to illuminate the alignment screen; and an image-forming optical system configured to image the pattern passing through the objective lens on a retina of an observer when an end face of the guiding device is coincident with a position corresponding to the examination site.

With this configuration, it is possible to perform the alignment procedure of the guiding device relative to the objective lens without using excitation light, thus making it unnecessary to take measures such as blocking the excitation light during operation, which allows the alignment procedure to be conducted more simply.

The third aspect described above may further include a relay optical system configured to form an intermediate image of the pattern when the end face of the guiding device is coincident with a position corresponding to the examination site; and a second screen provided with a second pattern which is located at a position where the intermediate image is formed by the relay optical system.

By fixing the guiding device and the objective lens at a position where in-focus observed images of the pattern on the alignment screen and the second pattern on the second screen are simultaneously obtained or at a position shifted therefrom by a prescribed distance, it is possible to perform alignment of the guiding device with further improved precision.

A fourth aspect of the present invention is an alignment apparatus for a guiding device which is attached to an end of an objective lens in such a manner as to be capable of positional adjustment in an optical axis direction and which is brought into contact with an examination target to make a focal position of the objective lens coincident with an examination site, the alignment apparatus including an objective-lens securing portion configured to secure the objective lens, to which the guiding device is attached, so as to enable positional adjustment, an alignment screen provided with a prescribed pattern being attached to the guiding device at an end portion thereof; a visible light source configured to illuminate the alignment screen; an image-acquisition device to image the pattern passing through the objective lens; and an image-forming optical system configured to image the pattern passing through the objective lens on the image-acquisition device when an end face of the guiding device is coincident with a position corresponding to the examination site.

By having the pattern imaged on the image-acquisition device, it is possible to perform the alignment of the guiding device with more simplified procedure.

The present invention affords an advantage in that it is possible to easily locate the end face of the narrow-diameter end portion at a suitable position relative to the examination target, without setting an examination site, which allows straightforward and rapid acquisition of an image of the examination site.

DETAILED DESCRIPTION OF THE INVENTION

A guiding-device alignment screen 1 according to an embodiment of the present invention will be described below with reference to FIGS. 1 to 4.

Figure 1:
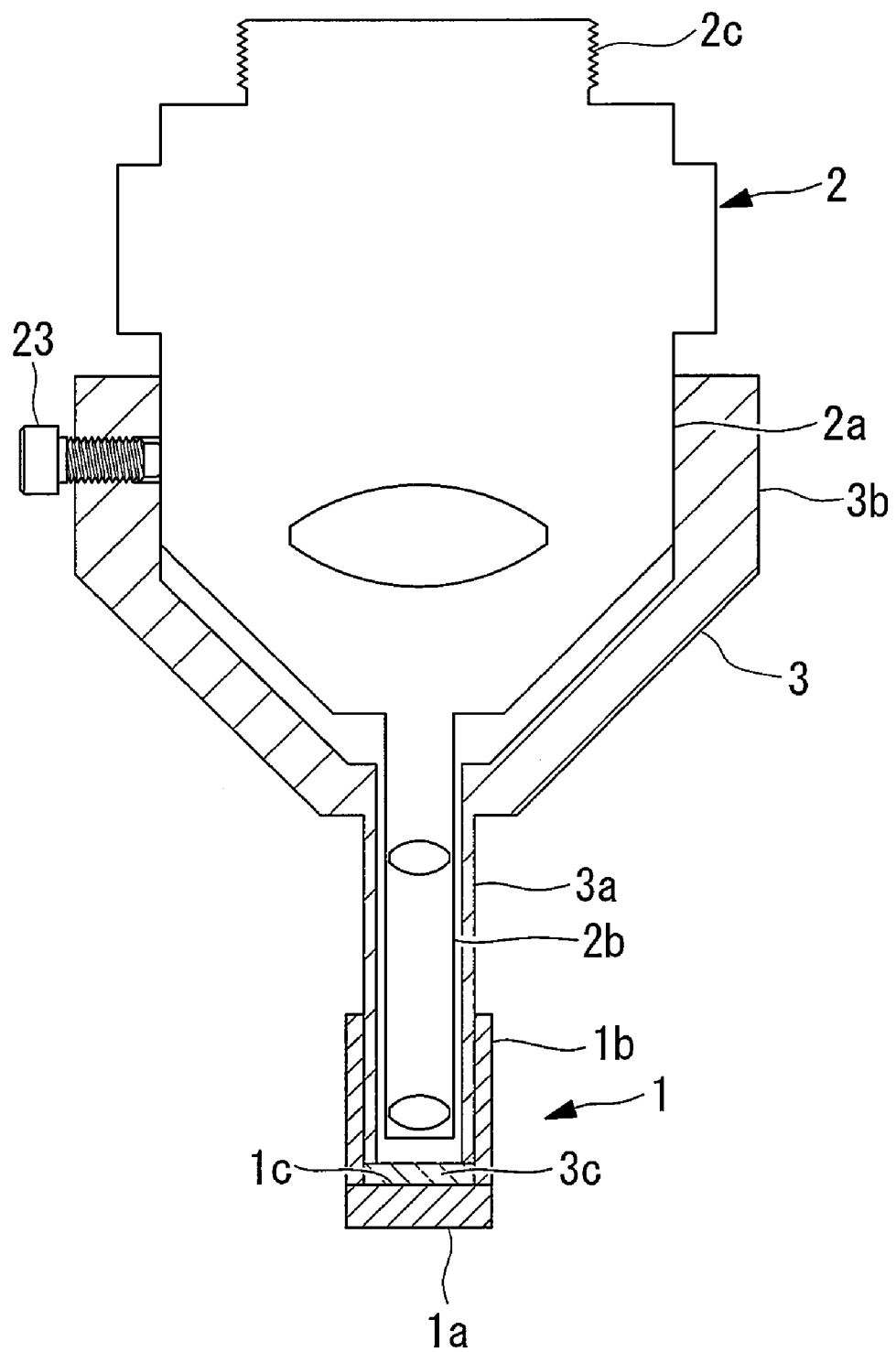
FIG. 1 is a longitudinal sectional view showing, in outline, an alignment screen according to a first embodiment of the present invention attached to a guiding device.

As shown in FIG. 1, the alignment screen 1 according to this embodiment is used in positional alignment of a guiding device 3 which is attached to the end of an objective lens 2 in such a manner that it can be adjusted in position in the optical axis direction.

Figure 2:
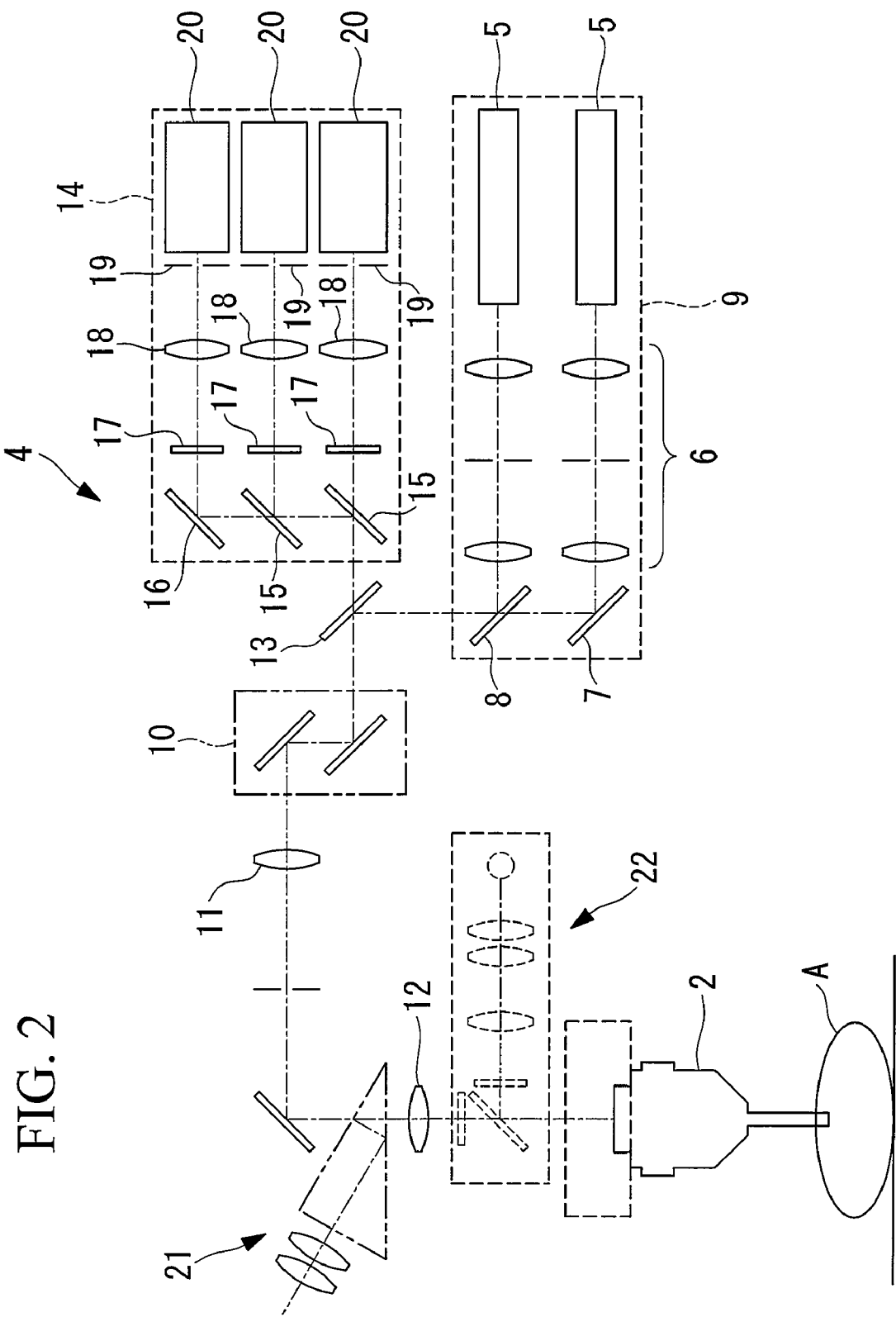
FIG. 2 is a diagram showing, in outline, the overall configuration of a fluorescence microscope apparatus including an objective lens to which the guiding device in FIG. 1 is attached.

As shown in FIG. 1, the objective lens 2 includes, for example, a large-diameter portion 2a and a narrow-diameter end portion 2b whose outer diameter is smaller than that of the large-diameter portion 2a. As shown in FIG. 2, the objective lens 2 is used while attached to a fluorescence microscope apparatus 4. Reference numeral 2c in FIG. 1 is a mounting thread.

In the example shown in FIG. 2, which is a laser-scanning confocal microscope, the fluorescence microscope apparatus 4 includes a light source portion 9, a scanner 10, a pupil-projection lens 11, an image forming lens (image-forming optical system) 12, the objective lens 2, a dichroic mirror 13, and a light detecting portion 14. The light source portion 9 includes laser light sources 5, collimator optical systems 6, a mirror 7, and a dichroic mirror 8. The scanner 10 two dimensionally scans laser light emitted from the light source portion 9. The pupil-projection lens 11 focuses the laser light scanned by the scanner 10, and the image-forming lens 12 converts the laser light focused by the pupil-projection lens 11 into substantially collimated light. The objective lens 2 focuses the laser light emerging from the image-forming lens 12 onto a specimen (examination target) A. The dichroic mirror 13 splits off, from the laser light, fluorescence returning from the specimen A after being collected by the objective lens 2 and returning via the image-forming lens 12, the pupil-projection lens 11, and the scanner 10. The light detecting portion 14 detects the fluorescence split off by the dichroic mirror 13.

The light detecting portion 14 includes dichroic mirrors 15 and a mirror 16 for splitting the fluorescence into different wavelengths; barrier filters 17 for cutting laser light contained in the fluorescence; confocal lenses 18 for focusing the fluorescence transmitted through the barrier filters 17; confocal pinholes 19 disposed in an optically conjugate positional relationship with respect to a focal position of the objective lens 2; and light detectors 20 for detecting the fluorescence passing through the confocal pinholes 19. Reference numeral 21 in the drawing is an eyepiece optical system, and reference numeral 22 is a bright-field illumination optical system.

As shown in FIG. 1, the guiding device 3 includes a cylindrical portion 3a for accommodating the narrow-diameter end portion 2b; a fitting portion 3b for fitting with the large-diameter portion 2a of the objective lens 2; and a set screw 23, projecting inward in the radial direction, in the fitting portion 3b, for securing the relative positions of the objective lens 2 and the guiding device 3 by pressing against the outer surface of the large-diameter portion 2a.

A transparent window member 3c is provided at the end of the cylindrical portion 3a so as to close off an opening at the end of the cylindrical portion 3a. By securing the guiding device 3 to the objective lens 2 and brining the window member 3c into contact with the specimen A, it is possible to quickly and precisely align the focal position of the objective lens 2 at a prescribed examination site on the specimen A. In addition, pulsing of the specimen A, which is in close contact with the window member 3c, is suppressed, and it is thus possible to acquire a clear, blur-free image of the living specimen A in vivo.

The alignment screen 1 includes a screen main body 1a which is placed in close contact with an end face of the window member 3c of the guiding device 3 and an attaching-and-detaching portion 1b which secures the screen main body 1a to the guiding device 3 in such a manner that it can be attached thereto and detached therefrom.

Figure 3:
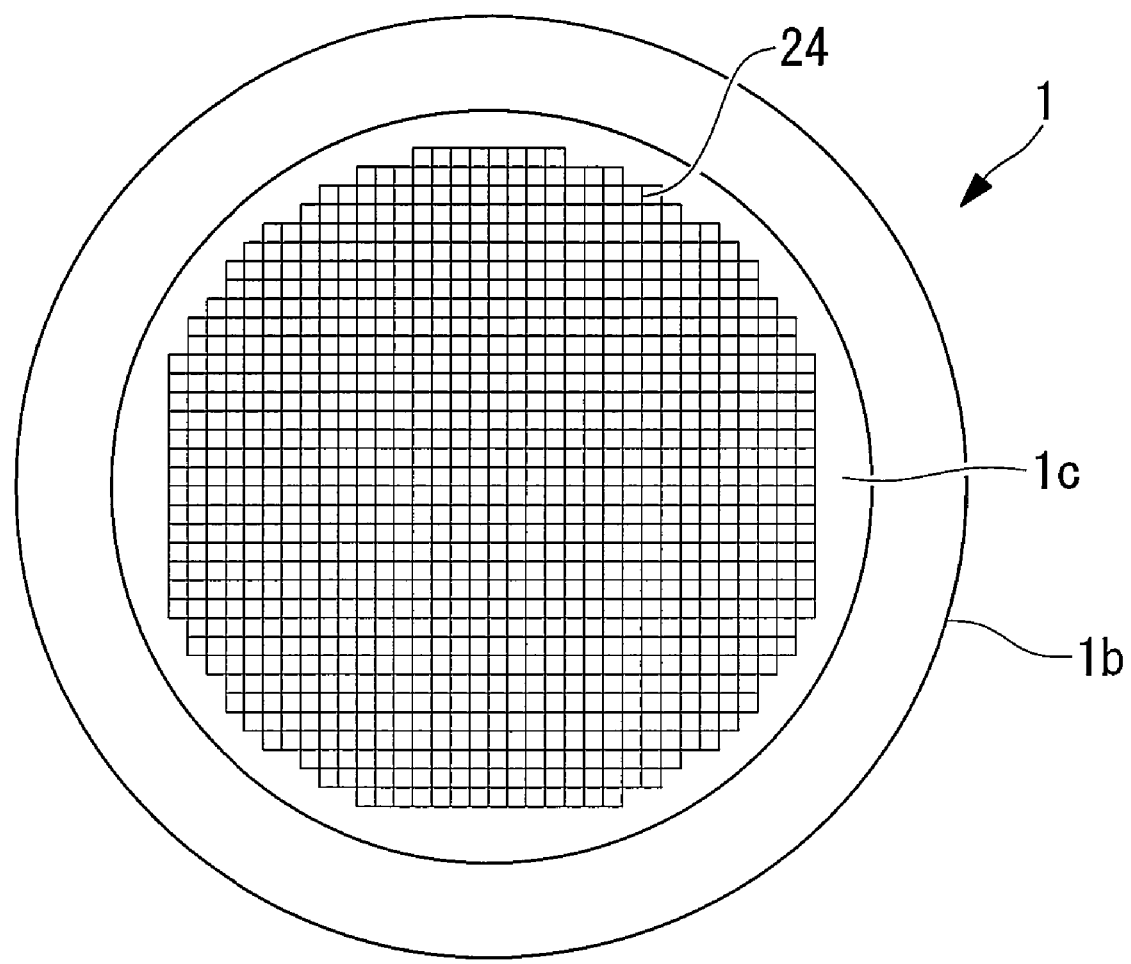
FIG. 3 is a front elevational view showing an example of a pattern formed on a flat surface of the alignment screen in FIG. 1.

The screen main body 1a, which is a flat plate-shaped member formed of fluorescent material, for example, includes a flat surface 1c which can be placed in close contact with the end face of the window member 3c. As shown in FIG. 3, indentations 24 formed of fine scores are provided in the flat surface 1c. The indentations 24 are provided in the form of a grating in the example shown in FIG. 3, but they may take any form, including stripes or points.

As shown in FIG. 1, the attaching-and-detaching portion 1b is formed in the shape of a cylinder that fits on the cylindrical portion 3a of the guiding device 3. By fitting the cylindrical portion 3a in the attaching-and-detaching portion 1b and inserting it to a position where the flat surface 1c abuts against the window member 3c at the end of the cylindrical portion 3a, it is possible to keep the alignment screen 1 attached to the guiding device 3, while ensuring close contact between the flat surface 1c and the window member 3c.

The operation of the alignment method and the alignment screen 1 for the guiding device 3 according to this embodiment, having such a configuration, will be described below.

To perform positional alignment of the guiding device 3 using the alignment screen 1 according to this embodiment, first the attaching-and-detaching portion 1b of the alignment screen 1 is fitted to the cylindrical portion 3a of the guiding device 3 and is attached so that the flat surface 1c of the screen main body 1a is in close contact with the end face of the window member 3c.

Figure 4:
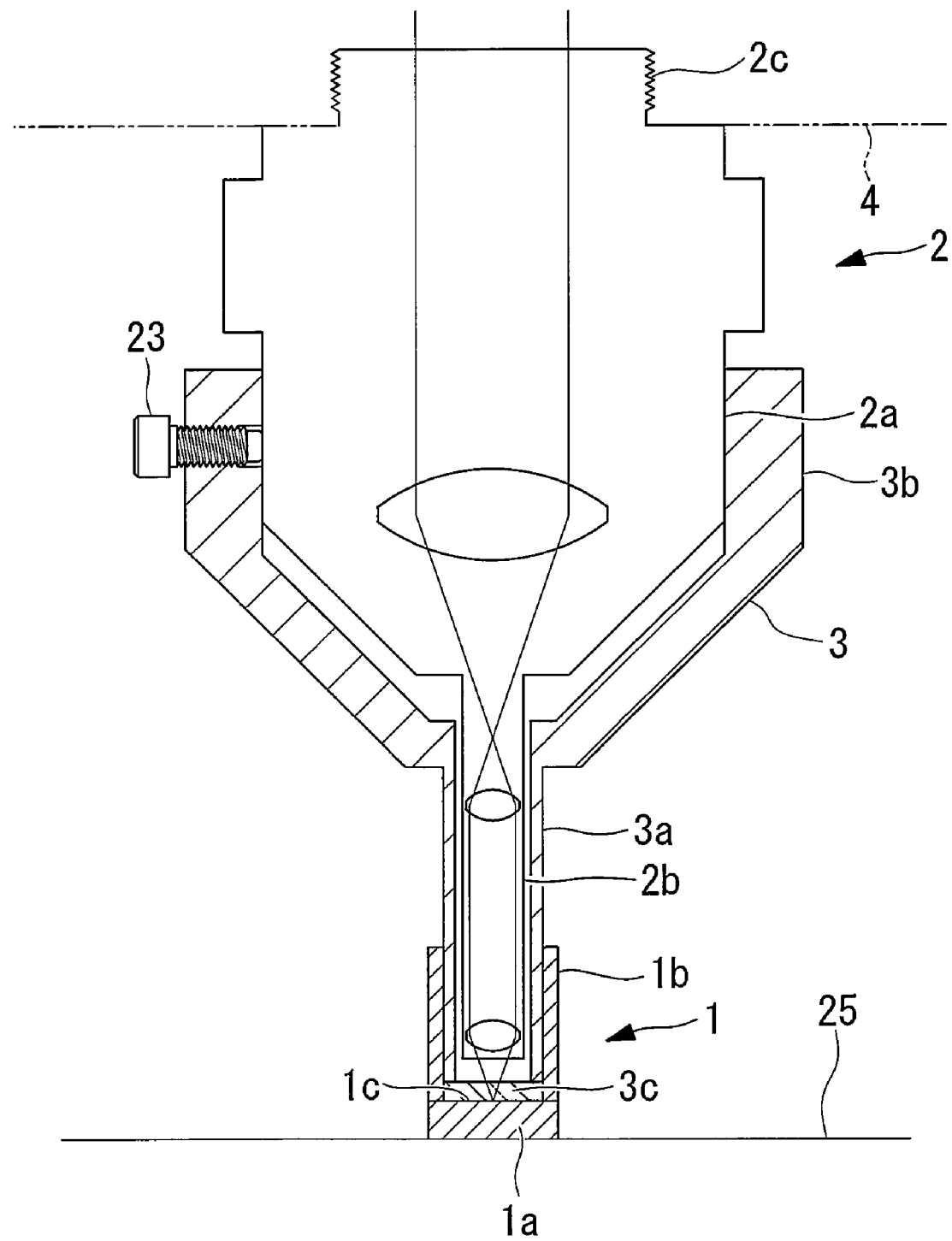
FIG. 4 is a longitudinal sectional view for explaining a method of aligning the guiding device using the alignment screen in FIG. 1.

Next, the narrow-diameter end portion 2b of the objective lens 2, which is attached to the fluorescence microscope apparatus 4 so as to point vertically downward, is accommodated in the cylindrical portion 3a of the guiding device 3, and the fitting portion 3b of the guiding device 3 is fitted to the large-diameter portion 2a of the objective lens 2. Then, as shown in FIG. 4, the alignment screen 1, which is attached to the end of the guiding device 3, is held so as to be sandwiched between the guiding device 3 and a stage 25. Thus, by moving the objective lens 2 up and down using a focusing mechanism (not shown in the drawings) of the fluorescence microscope apparatus 4, it is possible to relatively move the objective lens 2 and the guiding device 3 in the optical axis direction of the objective lens 2.

In this state, the fluorescence microscope apparatus 4 is operated to two-dimensionally scan the laser light emitted from the light source portion 9 using the scanner 10. After being emitted from the end of the objective lens 2, the laser light is focused at the focal position of the objective lens 2. Because the guiding device 3 is disposed at the end of the objective lens 2, the laser light is transmitted through the window member 3c of the guiding device 3 and is incident on the screen main body 1a of the alignment screen 1, which is in close contact with the window member 3c.

Because the screen main body 1a is formed of a fluorescent material, it produces fluorescence upon being irradiated with the laser light. Then, the fluorescence produced returns via the objective lens 2, the image-forming lens 12, the pupil-projection lens 11, and the scanner 10, and is detected by the light detector 20. Accordingly, a fluorescence image is acquired based on the rotation angle position of the scanner 10 and the fluorescence intensity detected by the light detector 20.

In this case, in the microscope apparatus 4, only fluorescence passing through the focal position of the objective lens 2 is detected by the light detector 20, and therefore, if the focal position of the objective lens 2 is not coincident with the end face of the window member 3c of the guiding device 3, only an image with an indistinct pattern is acquired. In addition, if the shift is large, the light intensity is low. Thus, by relatively moving the objective lens 2 and the guiding device 3 in the optical axis direction by operating the focusing mechanism of the fluorescence microscope 4, at the point in time when the focal position of the objective lens 2 is coincident with the end face of the window member 3c of the guiding device 3, the pattern of indentations 24 formed in the flat surface 1c of the screen main body 1a is acquired as the fluorescence image. As a result of diffraction or diffuse reflection of the fluorescence at the indentations 24, a fluorescence image in which the pattern of the indentations 24 forms a shadow is acquired.

By stopping operating the focusing mechanism at this point and fixing the fitting portion 3b of the guiding device 3 to the large-diameter portion 2a of the objective lens 2 by tightening the set screw 23, it is possible to secure the guiding device 3 and the objective lens 2, while the focal position of the objective lens 2 is coincident with the end face of the window member 3c at the end of the cylindrical portion 3a of the guiding device 3. Then, removing the alignment screen 1 from the cylindrical portion 3a of the guiding device 3 in this state completes the alignment of the guiding device 3.

After performing alignment in this way, it is possible to make the focal position of the objective lens 2 coincident with the outer surface of the specimen A merely by bringing the end face of the window member 3c of the guiding device 3 into close contact with the actual specimen A to be observed, which allows a fluorescence image of the outer surface of the specimen A to be acquired rapidly and with good precision. Moreover, pressing the end face of the window member 3c of the guiding device 3 against the specimen A with a prescribed force allows pulsing of the specimen A to be suppressed, which makes it possible to acquire a blur-free fluorescence image.

Figure 5:
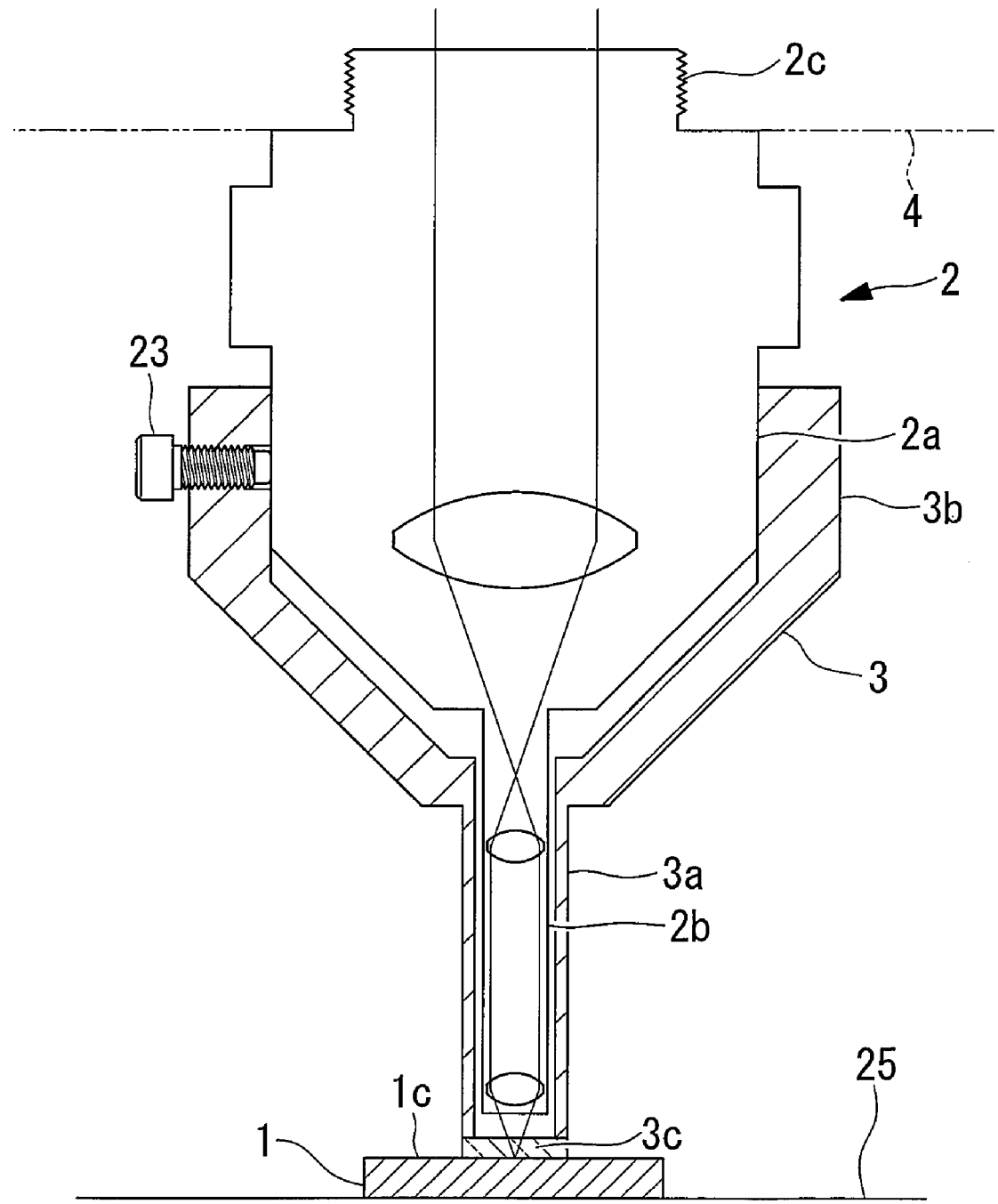
FIG. 5 is a longitudinal sectional view showing, in outline, a case where an alignment screen formed of a fluorescent plate is used instead of the alignment screen in FIG. 1.

In this embodiment, the alignment screen 1 is attached to the guiding device 3 by fitting the attaching-and-detaching portion 1b, provided on the alignment screen 1, on the cylindrical portion 3a of the guiding device 3. Instead of this, however, as shown in FIG. 5, the alignment screen 1 may be formed of just a flat fluorescent plate which is sandwiched between the guiding device 3 and the stage 25.

Instead of, or in addition to, attaching it by fitting the attaching-and-detaching portion 1b, it may be bonded using an adhesive which can be easily peeled off.

Instead of using the alignment screen 1 in which the indentations 24 formed of scores are made in the flat surface 1c of the screen main body 1a, which is made of the fluorescent substance, it is also possible to use, among others, an alignment screen 1 in which an ink pattern formed of a non-fluorescent substance is printed on the flat surface 1c of the screen main body 1a made of a fluorescent substance, an alignment screen 1 in which an ink pattern formed of a fluorescent substance is printed on the flat surface 1c of the screen main body 1a made of a non-fluorescent substance, or an alignment screen 1 in which a transparent film (not shown in the drawings) having a printed ink pattern formed of a non-fluorescent substance is overlaid on the flat surface 1c of the screen main body 1a made of a fluorescent substance.

By printing an ink pattern formed of a fluorescent substance, the fluorescence intensity is maximized when the focal position of the objective lens 2 is coincident with the flat surface 1c of the screen main body 1a, thus affording the advantage that it is easy to decide when the system is in focus. In addition, with the method of overlaying a transparent film, it is possible to replace the transparent film each time the system is used, which can prevent the occurrence of problems such as cross-contamination.

Figure 6:
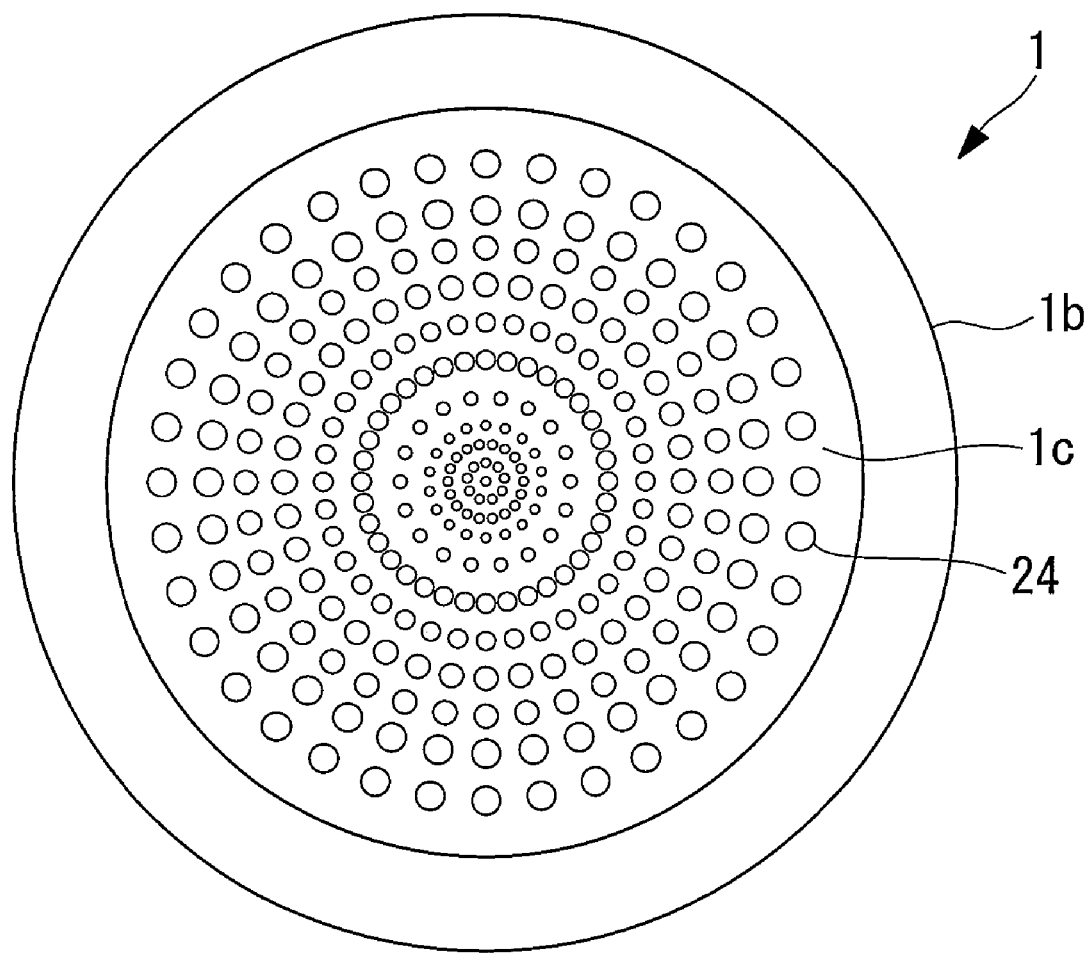
FIG. 6 is a front elevational view showing a modification of the pattern formed on the flat surface of the alignment screen in FIG. 1.

The pattern is not limited to that shown in FIG. 3. For example, as shown in FIG. 6, it is possible to use a pattern formed of point-shaped indentations 24 which are finer at the center and coarser at the edges. By doing so, even if the field of view changes due to a change in magnification, it is possible to simplify the focusing operation.

Figure 7:
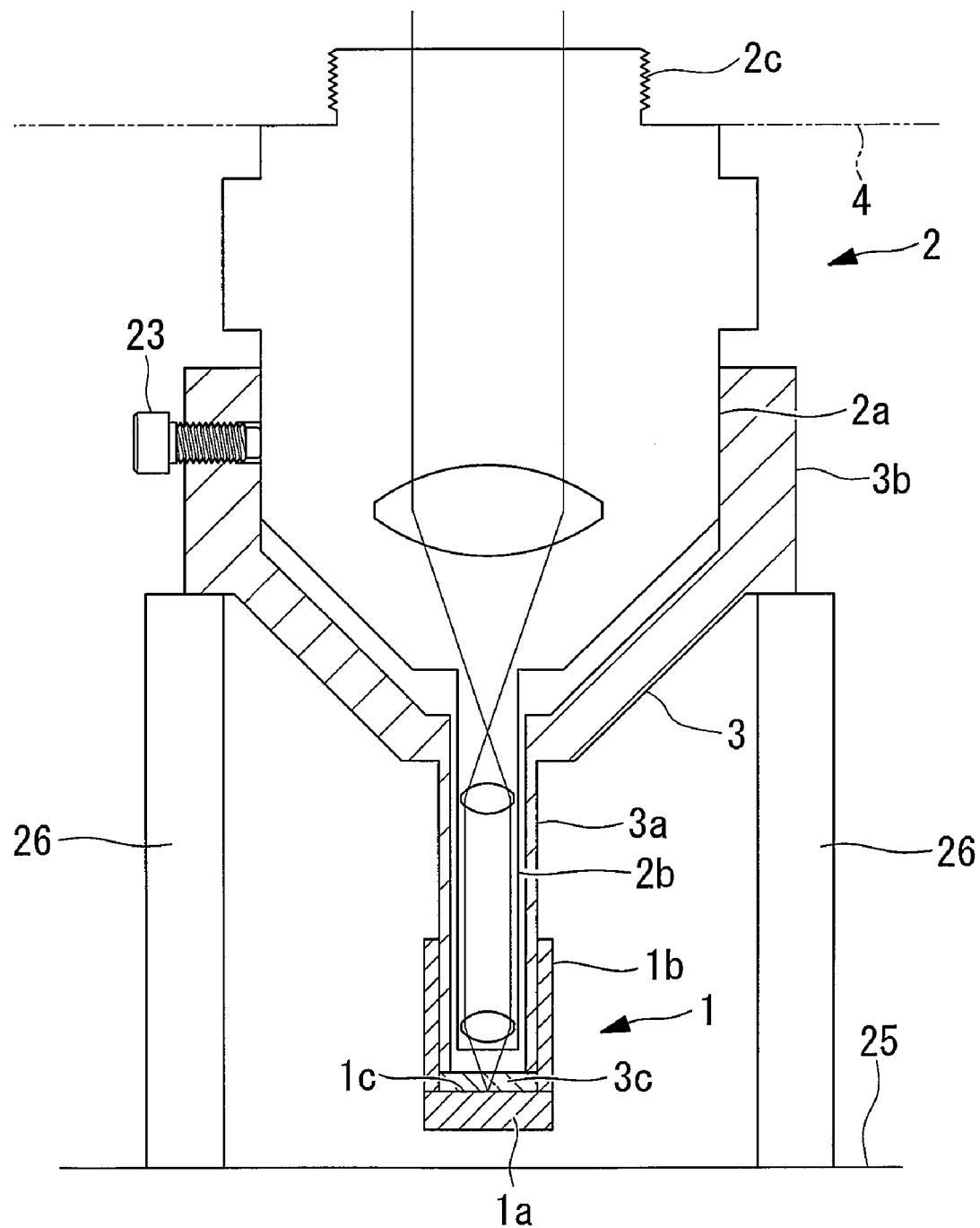
FIG. 7 is a longitudinal sectional view for explaining a first modification of the method of aligning the guiding device using the alignment screen in FIG. 1.

The screen main body 1a of the alignment screen 1 is sandwiched between the guiding device 3 and the stage 25 in this embodiment. Instead of this, however, as shown in FIG. 7, a support base 26 for supporting the fitting portion 3b of the guiding device 3 may be provided, and the alignment screen 1 at the end of the guiding device 3 may be supported so as to be suspended above the stage 25. By doing so, even if the narrow-diameter end portion 2b of the objective lens 2 is lowered too far by operating the focusing mechanism and comes into contact with the window member 3c, it is possible to prevent an excessively large force from acting on the objective lens 2 merely by causing the window member 3c to break, thus avoiding damage to the objective lens 2.

Figure 8:
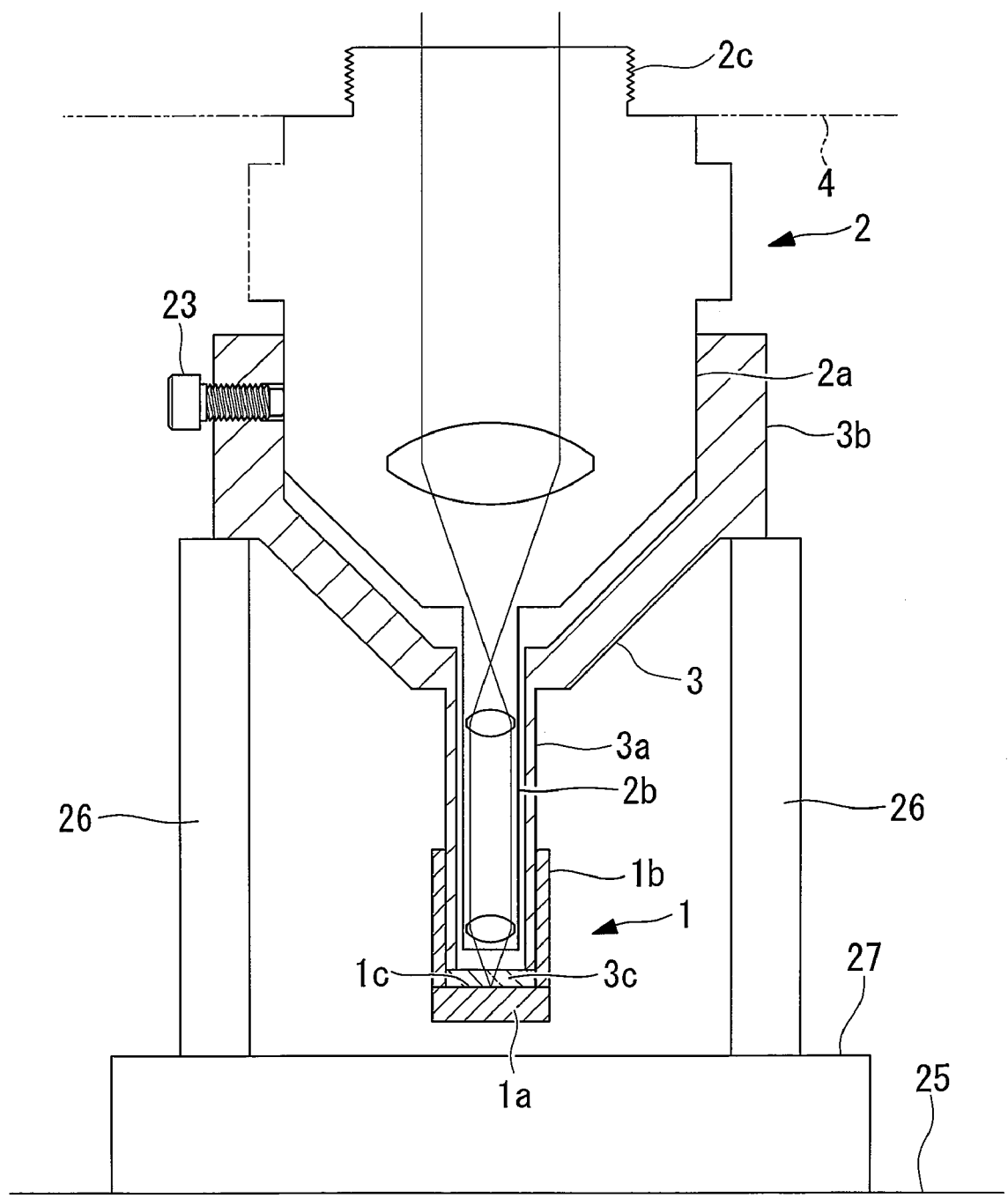
FIG. 8 is a longitudinal sectional view for explaining a second modification of the method of aligning the guiding device using the alignment screen in FIG. 1.

In this case, as shown in FIG. 8, a load sensor 27 may be provided on the support base 26 for measuring the pressing force transmitted from the objective lens 2 to the guiding device 3. By doing so, it is possible to prevent the narrow-diameter end portion 2b of the objective lens 2 from being lowered too far, thus avoiding damage to the window member 3c.

Figure 9:
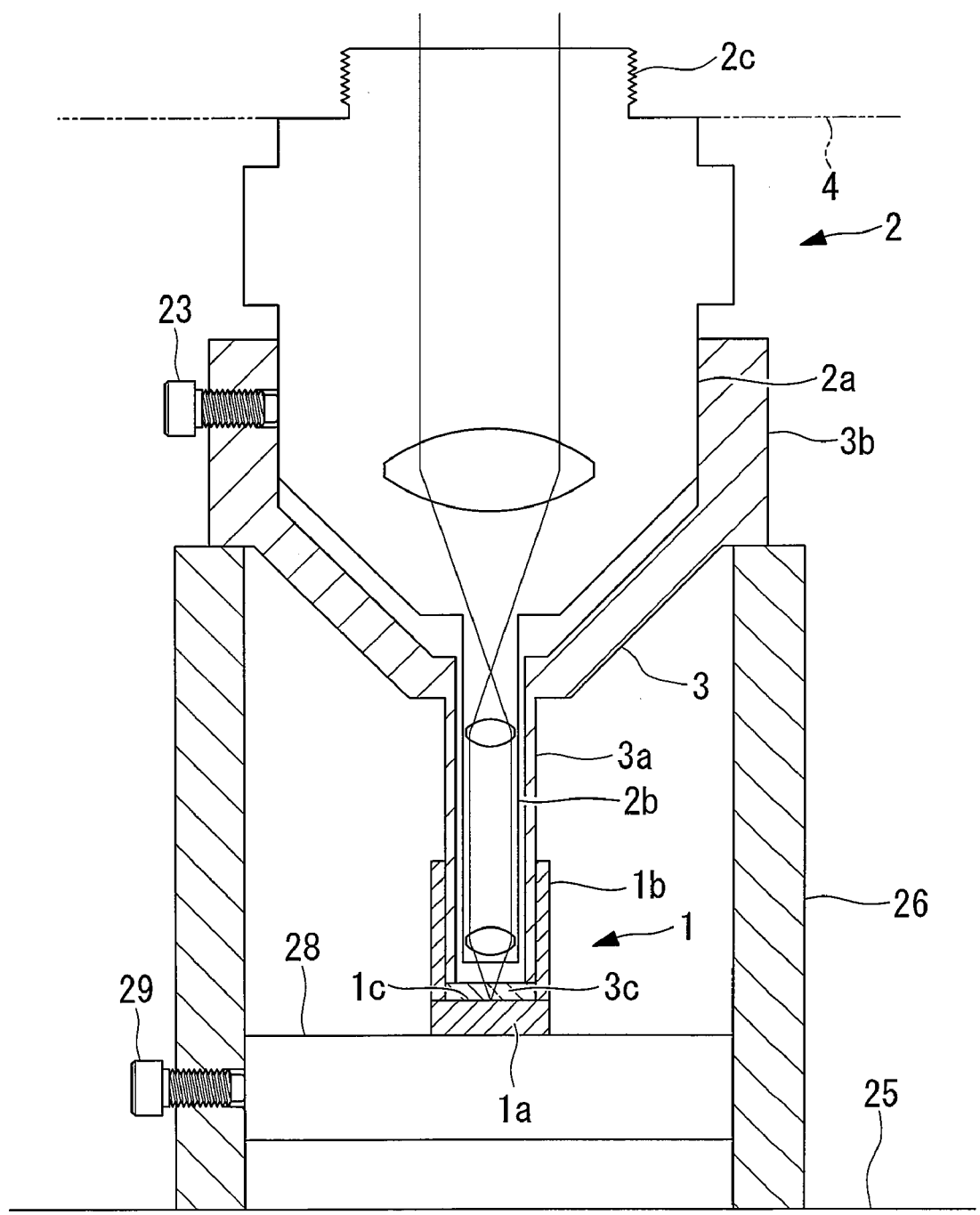
FIG. 9 is a longitudinal sectional view for explaining a third modification of the method of aligning the guiding device using the alignment screen in FIG. 1.

A lift 28 which can be raised and lowered may be provided below the guiding device 3, which is supported by the support base 26, as shown in FIG. 9 in order to adjust the position of the alignment screen 1 while pressing the alignment screen 1 in close contact against the cylindrical portion 3a of the guiding device 3 without fixing the alignment screen 1 to the cylindrical portion 3a. By doing so, the lift 28 can be raised and lowered according to the difference in length of the cylindrical portion 3a depending on the type of guiding device 3, allowing it to be aligned at an arbitrary height position where the alignment screen 1 is placed in close contact with the window member 3c of the guiding device 3. Reference numeral 29 is a locking screw.

Figure 10:
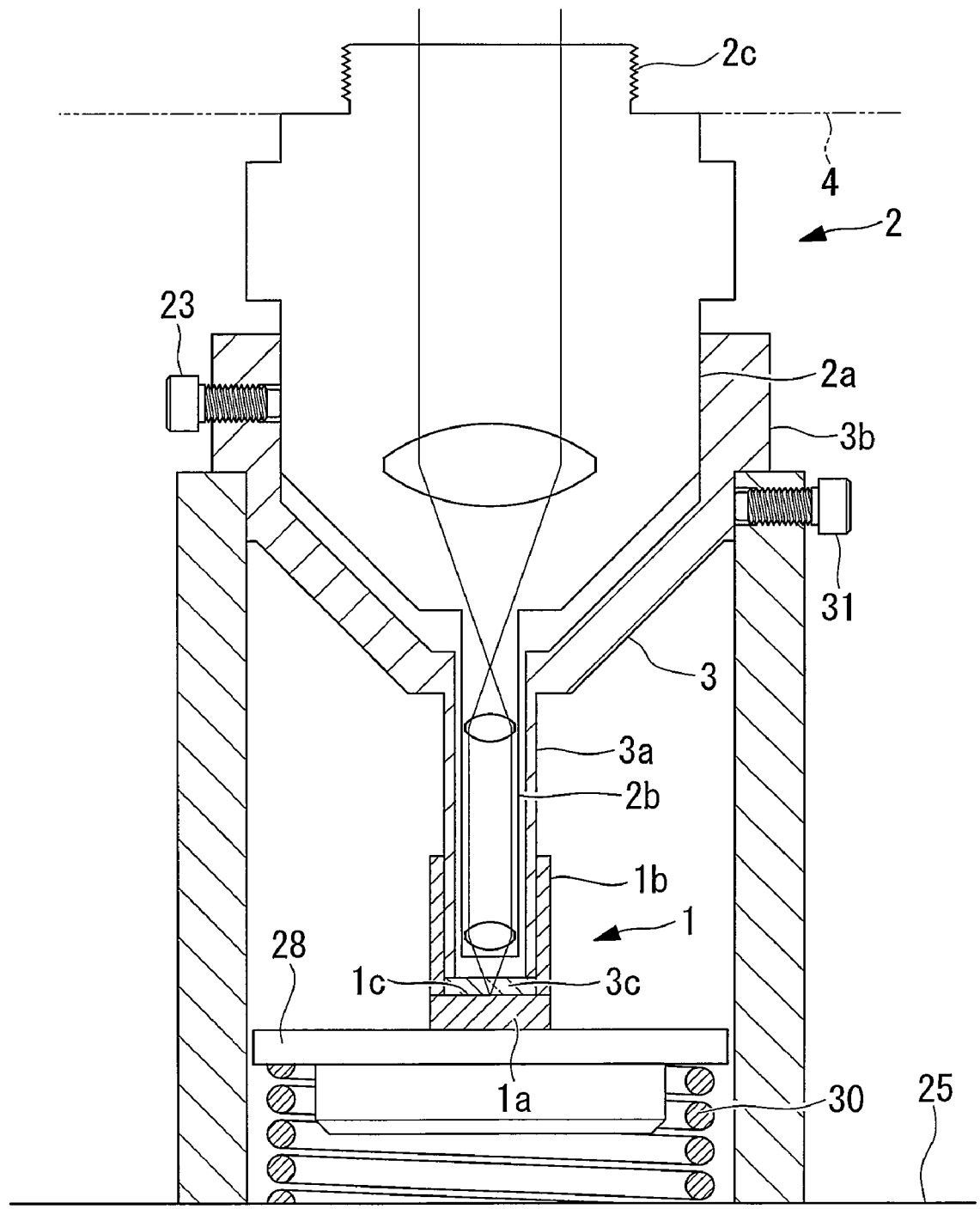
FIG. 10 is a longitudinal sectional view for explaining a fourth modification of the method of aligning the guiding device using the alignment screen in FIG. 1.

As shown in FIG. 10, a spring 30 for urging the lift 28 upwards may be provided. By doing so, even if the length of the cylindrical portion 3a differs depending on the type of guiding device 3, the urging force of the spring 30 enables the alignment screen 1 to be kept in close contact with the window member 3c of the guiding device 3. Reference numeral 31 is a locking screw.

Figure 11:
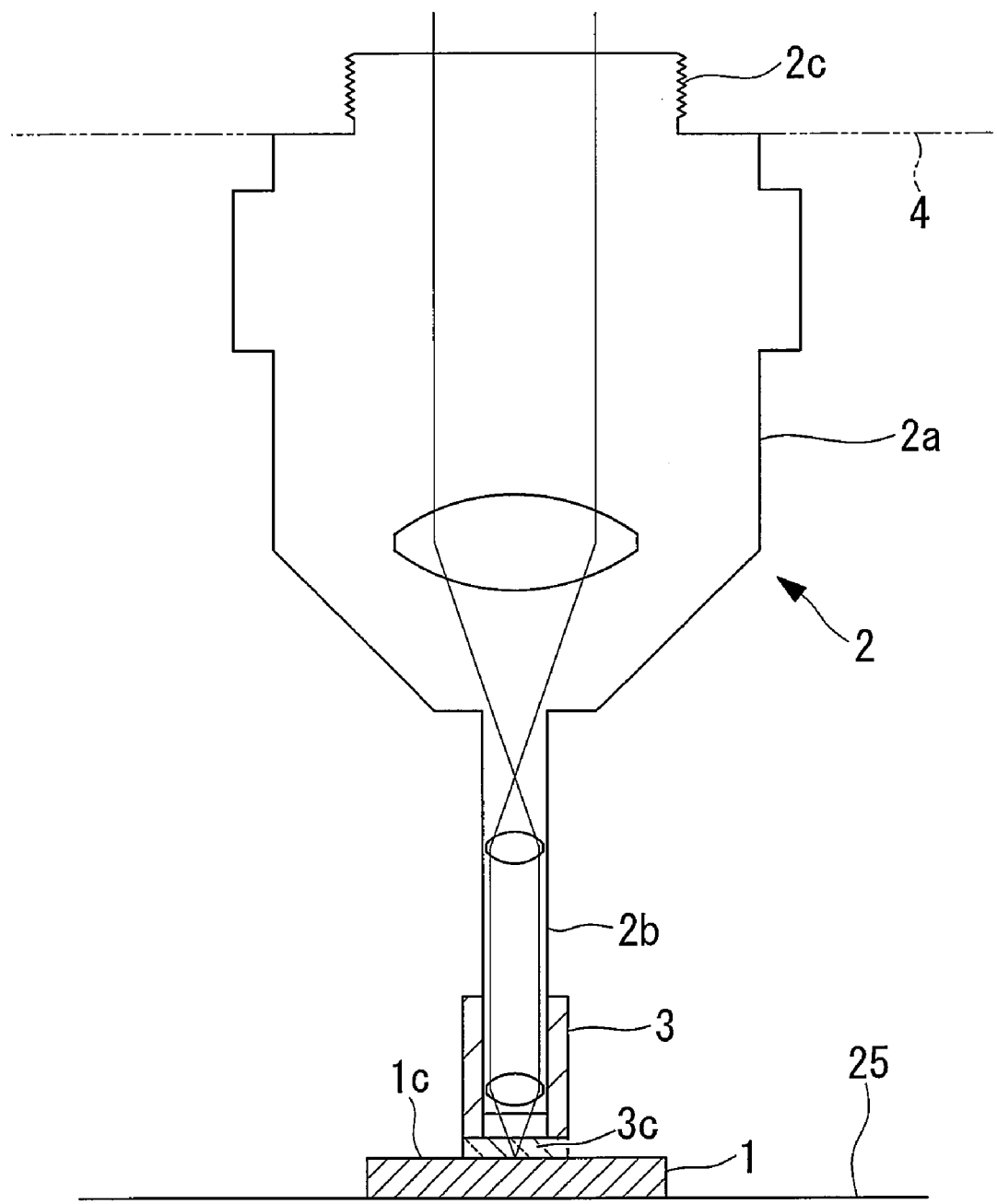
FIG. 11 is a longitudinal sectional view for explaining an alignment method when using a different guiding device from the guiding device in FIG. 1.

In this embodiment, the guiding device 3 has been illustrated by a device provided with a fitting portion 3b for fitting to the large-diameter portion 2a of the objective lens 2, and a thumb screw 23 for securing the two. Instead of this, however, as shown in FIG. 11, it may also be applied to a guiding device 3 of the type that is attachably and detachably fitted to the narrow-diameter end portion 2b of the objective lens 2.

In this embodiment, the guiding device 3 and the objective lens 2 are secured at a position where the pattern on the alignment screen 1 is in focus. Thus, it is possible to locate the focal position of the objective lens 2 at the end face of the window member 3c of the guiding device 3 with superior precision. However, when the examination site of the specimen A is not the outer surface of the specimen A but is located farther inside, it is necessary to relatively move the objective lens 2 and the guiding device 3 farther, from the state where the focal position of the objective lens 2 is located at the end face of the window member 3c of the guiding device 3, to locate the focal position of the objective lens 2 farther toward the front, in the optical axis direction, than the end face of the window member 3c. In such a case, the objective lens 2 and the guiding device 3 should be made to move relative to each other with superior precision by operating the focusing mechanism.

In the alignment method of the guiding device 3 according to this embodiment, a description has been given of an alignment method in which the fluorescence microscope 4 is used with the guiding device 3 attached to the objective lens 2, which is in turn attached to the fluorescence microscope 4. When using the fluorescence microscope 4, however, it is necessary to radiate laser light that serves as excitation light, and from the viewpoint of preventing leakage of the laser light, it is thus necessary to enclose it inside a black box or the like. Therefore, there is a drawback in that it is not possible to perform the alignment procedure while visually checking the objective lens 2 and the guiding device 3.

Figure 12:
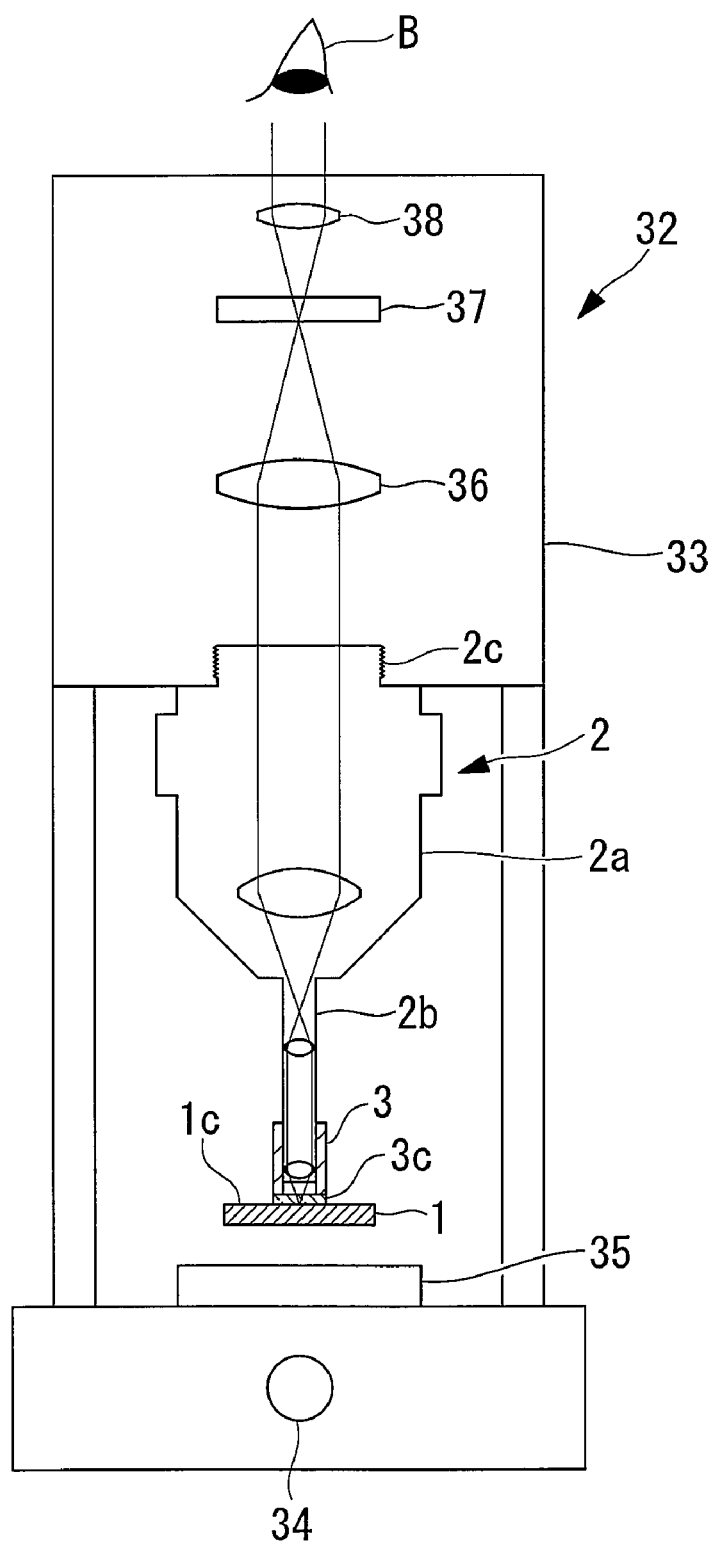
FIG. 12 is a diagram showing, in outline, a guiding-device alignment apparatus according to a first embodiment of the present invention.

In order to overcome this problem, it is preferable to use an alignment apparatus 32 for the guiding device 3, such as that shown in FIG. 12, for example. This alignment apparatus 32 includes an objective-lens support base (objective-lens securing portion) 33 for attaching the objective lens 2, to which the guiding device 3 provided with the alignment screen 1 is attached; a visible light source 34; a diffusing plate 35 for diffusing the visible light emitted from the visible light source 34; a relay lens (relay optical system) 36 for collecting the visible light passing through the alignment screen 1 and the objective lens 2 from the diffusing plate 35 and forming an intermediate image; a second screen 37 disposed at the position where the intermediate image is formed and having a prescribed pattern; and an image-forming lens 38 for collecting the visible light passing through the second screen 37 and imaging it on the retina of an observer B.

By moving the guiding device 3, to which the alignment screen 1 is attached, relative to the objective lens 2 in the optical axis direction thereof while looking through the image-forming lens 38, the observer B searches for the position where a clear, in-focus observed image of the pattern provided on the alignment screen 1 is obtained. Then, by more finely adjusting the position of the guiding device 3 in that state, he or she searches for the position where clear, in-focus images of the pattern on the alignment screen 1 and the pattern on the second screen 37 are simultaneously obtained. By doing so, it is possible to make the position of the end face of the window member 3c of the guiding device 3 coincident with the focal position of the objective lens 2 with superior precision.

In this case, because excitation light such as laser light is not used, it is not necessary to enclose the system in a black box or the like, and the observer B can thus perform the alignment procedure while directly viewing the objective lens 2 and the guiding device 3. Therefore, it is possible to simplify the alignment operation.

Figure 13:
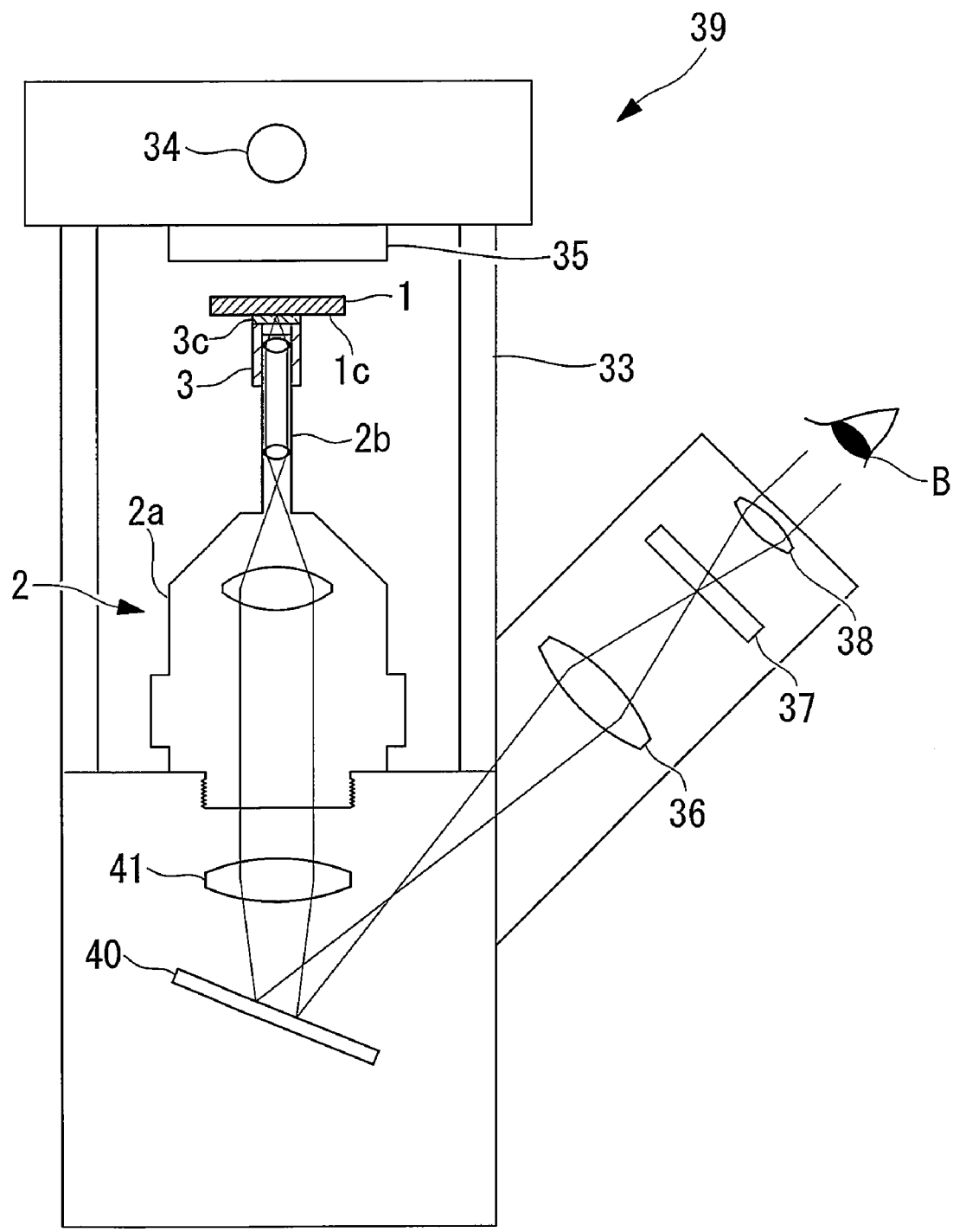
FIG. 13 is a diagram showing, in outline, a first modification of the alignment apparatus in FIG. 12.
Figure 14:
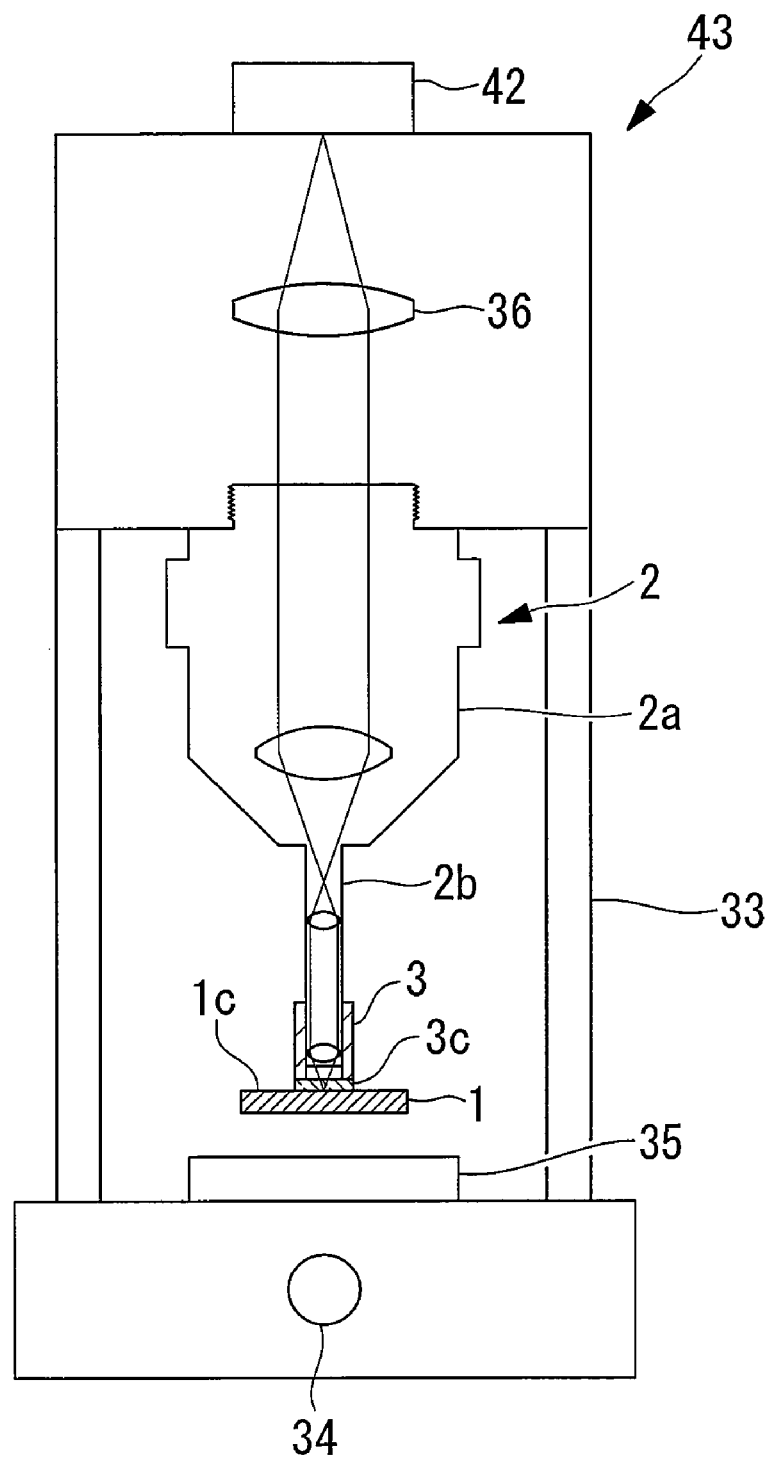
FIG. 14 is a diagram showing, in outline, a second modification of the alignment apparatus in FIG. 12.

Although an upright alignment apparatus 32 is shown in FIG. 12, an inverted alignment apparatus, such as that shown in FIG. 13, may be used. Here, reference numeral 40 is a mirror, and reference numeral 41 is a relay lens. In addition, as shown in FIG. 14, instead of the image-forming lens 38, it is possible to use an alignment apparatus 43 provided with an image-acquisition device 42, such as a CCD. In this case, since it is not necessary to provide a focusing mechanism for the eye of the observer B and since the second screen 37 becomes unnecessary, the configuration can be simplified.

What is claimed is:

1. An alignment method for a guiding device which is attached to an end of an objective lens in such a manner as to be capable of positional adjustment in an optical axis direction and which is brought into contact with an examination target to make a focal position of the objective lens coincident with an examination site, the alignment method comprising:
   securing, to an end face of the guiding device, an alignment screen, having a predetermined pattern, at a position which intercepts the optical axis of the objective lens when the guiding device is attached thereto;
   relatively moving the objective lens and the guiding device, to which the alignment screen is secured, in the optical axis direction;
   fixing relative positions of the objective lens and the guiding device at a position where an in-focus image of the pattern of the alignment screen is obtained, or at a position further relatively shifted by a predetermined distance from that position; and
   removing the alignment screen from the guiding device.

2. An alignment method for a guiding device according to claim 1, wherein the alignment screen is supported on the guiding device, and the guiding device and the objective lens are relatively moved.

3. An alignment method for a guiding device according to claim 1, wherein the guiding device and the objective lens are moved relatively while measuring a load applied to one of the guiding device and the objective lens.

4. An alignment screen used in the alignment method for a guiding device according to claim 1, comprising:
   a screen main body having a flat surface placed in close contact with the end of the guiding device; and
   an attaching-and-detaching portion configured to attach the screen main body to the guiding device in such a manner as to allow attachment thereto and detachment therefrom,
   wherein the alignment screen has a predetermined pattern on the flat surface.

5. An alignment screen according to claim 4, wherein:
   the screen main body is formed of a fluorescent material; and
   the pattern is formed of indentations provided in the flat surface.

6. An alignment screen according to claim 4, wherein:
   the screen main body is formed of a fluorescent material; and
   the pattern is printed on the flat surface.

7. An alignment screen according to claim 4, wherein:
   the screen main body is formed of a fluorescent material; and
   the pattern is printed on a transparent sheet covering the flat surface.

8. An alignment screen according to claim 4 wherein:
the screen main body is formed of a non-fluorescent material; and
a pattern of fluorescent material is printed on the flat surface.

9. An alignment screen according to claim 4, wherein the pattern is formed more finely at a center portion than at edge portions.

10. An alignment apparatus for a guiding device which is attached to an end of an objective lens in such a manner as to be capable of positional adjustment in an optical axis direction and which is brought into contact with an examination target to make a focal position of the objective lens coincident with an examination site, the alignment apparatus comprising:
an objective-lens securing portion configured to secure the objective lens to which the guiding device is attached, so as to be capable of positional adjustment, an alignment screen provided with a prescribed pattern being attached to the guiding device at an end portion thereof;
a visible light source configured to illuminate the alignment screen; and
an image-forming optical system configured to image the pattern passing through the objective lens on a retina of an observer when an end face of the guiding device is coincident with a position corresponding to the examination site.

11. An alignment apparatus for a guiding device according to claim 10, further comprising:
a relay optical system configured to form an intermediate image of the pattern when the end face of the guiding device is coincident with a position corresponding to the examination site; and
a second screen provided with a second pattern which is located at a position where the intermediate image is formed by the relay optical system.

12. An alignment apparatus for a guiding device which is attached to an end of an objective lens in such a manner as to be capable of positional adjustment in an optical axis direction and which is brought into contact with an examination target to make a focal position of the objective lens coincident with an examination site, the alignment apparatus comprising:
an objective-lens securing portion configured to secure the objective lens, to which the guiding device is attached, so as to enable positional adjustment, an alignment screen provided with a prescribed pattern being attached to the guiding device at an end portion thereof;
a visible light source configured to illuminate the alignment screen;
an image-acquisition device to image the pattern passing through the objective lens; and an image-forming optical system configured to image the pattern passing through the objective lens on the image-acquisition device when an end face of the guiding device is coincident with a position corresponding to the examination site.

* * * * *